United States Patent
Yi et al.

(10) Patent No.: US 6,269,790 B1
(45) Date of Patent: Aug. 7, 2001

(54) COMBUSTION CHAMBER FOR DISI ENGINES WITH EXHAUST SIDE PISTON BOWL

(75) Inventors: Jianwen Yi; Jialin Yang, both of Canton; Richard Walter Anderson, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/434,347

(22) Filed: Nov. 5, 1999

(51) Int. Cl.[7] ............................................. F02B 3/02
(52) U.S. Cl. ........................ 123/295; 123/298; 123/301; 123/305
(58) Field of Search ................................. 123/295, 298, 123/301, 305

(56) References Cited

U.S. PATENT DOCUMENTS

| | | |
|---|---|---|
| 4,920,937 | 5/1990 | Sasaki . |
| 4,958,604 | 9/1990 | Hashimoto . |
| 5,245,975 | 9/1993 | Ito . |
| 5,259,348 | 11/1993 | Kobayashi . |
| 5,479,889 | 1/1996 | Sato . |
| 5,553,588 | 9/1996 | Gono . |
| 5,676,107 | 10/1997 | Yuzuriha . |
| 5,735,240 | 4/1998 | Ito et al. . |
| 6,003,488 | * 12/1999 | Roth ........................................ 123/298 |
| 6,009,849 | * 1/2000 | Yamamoto et al. .................. 123/305 |
| 6,062,192 | * 5/2000 | Wirth et al. ........................... 123/295 |
| 6,067,954 | * 5/2000 | Kudou et al. ......................... 123/295 |
| 6,095,113 | * 8/2000 | Nogi et al. ............................ 123/295 |

FOREIGN PATENT DOCUMENTS 0 778 402 A1   11/1997   (EP) .

* cited by examiner

Primary Examiner—Erick Solis
(74) Attorney, Agent, or Firm—Jerome R. Drouillard, Esq

(57) ABSTRACT

A stratified-charge combustion system design for direct-injection spark-ignited engines with the piston bowl in the exhaust-valve side. The air flow from the inlet valve provides a normal tumble in cylinder air flow. The fuel injector is positioned on the intake-valve side of the combustion cylinder and forms a charge stratification in the combustion chamber. With the piston bowl on the exhaust-valve side, the distance for spray penetration of the fuel from the injector is extended. The rate of fuel spray penetration in the combustion chamber is reduced by counter air flow against the fuel spray. The air-fuel mixture is moved upwardly to the area of the spark plug by the tumble air flow for ignition. The invention provides less piston bowl wall wetting which results in less soot formation and less emissions of undesirable hydrocarbons.

5 Claims, 2 Drawing Sheets

COMBUSTION CHAMBER FOR DISI ENGINES WITH EXHAUST SIDE PISTON BOWL

TECHNICAL FIELD

This invention relates to stratified-charge combustion systems for direct-injection spark-ignited engines.

BACKGROUND

Internal combustion engines are known which utilize spark-ignited direct in-cylinder fuel injection systems. The fuel injection mechanisms spray a fuel mist directly into each cylinder and inlet air is directed into the cylinder from one or more inlet ports to produce an appropriate air-fuel mixture in the combustion chamber. The air-fuel mixture is ignited by a spark plug during each cycle of the piston in the cylinder bore. Various piston bowl and combustion chamber configurations have been devised in order to provide appropriate air-fuel mixing and to direct the mixtures toward the spark plug for ignition, particularly in low load operation of the engines. It is an object of these systems to provide an overall lean but ignitable gas mixture and to reduce undesirable emissions in order to meet appropriate standards of fuel economy and emissions.

One object of these systems is to achieve charge stratification through direct fuel injection into the combustion chamber with minimum wall wetting by the fuel and with an overall lean but locally burnable fuel-air mixture directed to the spark plug.

Several attempts have been made to accomplish this by reorganizing the combustion chamber configuration, modifying the in-cylinder air flow, and optimizing fuel injection with respect to timing, location and spray characteristics. For example, U.S. Pat. No. 5,711,269 discusses a reverse tumble combustion system with a spherical bowl in the top of the piston near the intake valve side and with a fuel injector in the intake valve side. Also, U.S. Pat. No. 5,259,348 shows a stratified-charge combustion system with a swirl air flow and a bowl in the piston at the intake valve side. Although these systems have appeared to work well in practice, they still have relatively high hydrocarbon emissions and soot formation, some of which may result from an undesirable amount of wetting of the piston wall by the fuel spray.

It is thus desirable to provide a combustion chamber design which minimizes wetting of the piston bowl wall by the fuel injector and which further reduces hydrocarbon emissions and soot formation.

SUMMARY OF THE INVENTION

The present invention provides a unique combustion chamber design and system which minimizes wall wetting and provides an overall lean air-fuel mixture at an optimum position in the combustion chamber in order to secure improved fuel economy and reduced emissions. The inventive system utilizes a piston with a spherical or nearly spherical bowl configuration located near or adjacent to the exhaust valve side of the combustion chamber. The intake port design provides a normal tumble flow of intake air. The injector is located on the intake valve side of the combustion chamber and a small recess can be provided at the edge of the piston bowl in order to avoid contact with the injector and/or avoid impingement of the fuel spray outside the bowl.

The distance for penetration of the fuel spray is increased due to the positioning of the piston bowl. The spray droplets have more time to evaporate before they can contact the far wall of the piston bowl. Also, due to the normal tumble flow of inlet air, the direction of the fuel spray is in opposition to the direction of the tumble inlet air flow at certain points in the combustion cycle. This further slows the fuel droplet movement and allows more time for evaporation. Further, the in-cylinder tumble air flow moves the vapor and fuel cloud in the direction of the spark plug located adjacent the center of the cylinder head. Moreover, with the inventive system, a lower fuel spray penetration rate can be utilized.

Due to the unique combustion chamber and bowl design combined with the inlet air flow, the present invention minimizes wall wetting and overly rich fuel regions. This reduces soot formation and reduces the amount of unburned hydrocarbons. Also, the invention provides improved ignitability of the injected fuel and reduces cycle-by-cycle variations and misfirings.

Other objects and features of the present invention will become apparent when viewed in light of the detailed description of the preferred embodiments when taken in conjunction with the attached drawings and appended claims.

DESCRIPTION OF THE PREFERRED EMBODIMENT(S)

The present invention provides a combustion system with a piston bowl on the exhaust valve side of the combustion chamber, an in-cylinder normal tumble air flow, and an injector in the intake valve side of the combustion chamber in order to form improved charge stratification and ignition in the combustion chamber of a direct-injection spark-ignited (DISI) engine. The present invention forms an ignitable air-fuel mixture around the spark plug gap with less wetting of the piston by the fuel due to the extended distance for spray penetration, the reduction in the spray penetration rate by a counter air flow against the fuel spray, and by moving the fuel vapor upwardly to the spark plug by the tumble air flow.

Figure 1:
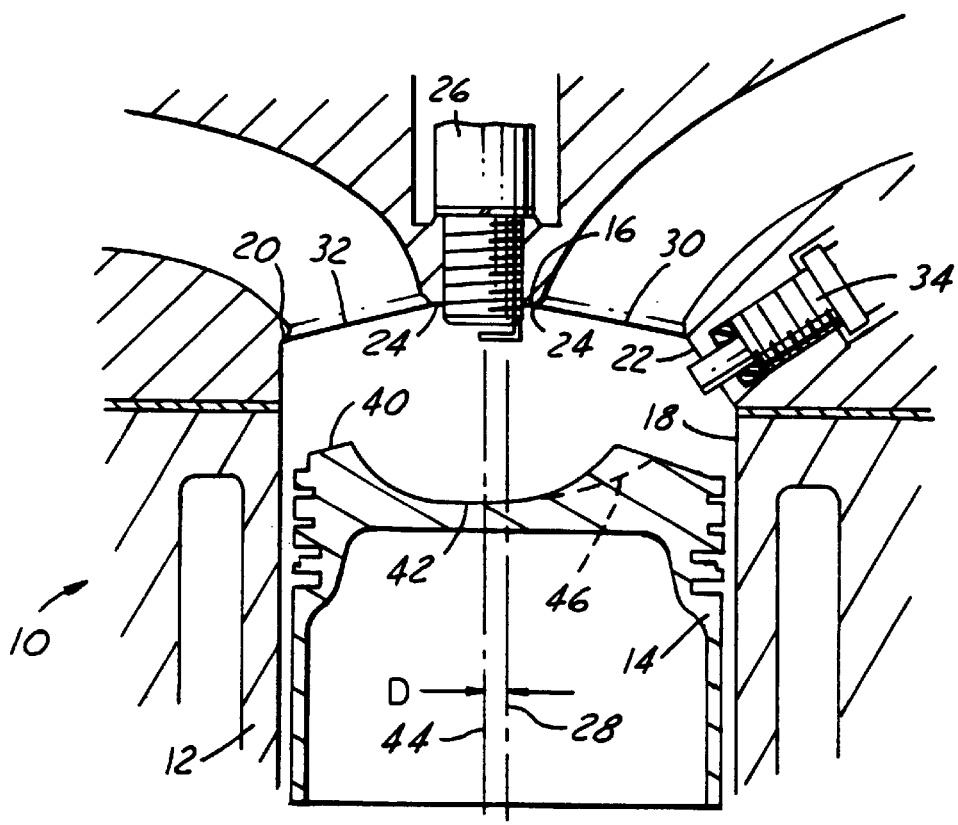
FIG. 1 is a cross-sectional view of a piston and cylinder configuration in accordance with the present invention.
Figure 2:
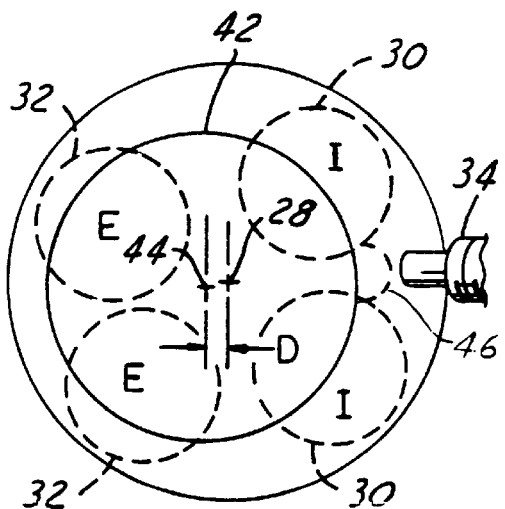
FIG. 2 is a top elevational view of a piston and combustion bowl configuration in accordance with the present invention.

FIGS. 1 and 2 illustrate the principal concepts of the present invention, with FIG. 1 being a cross-section of a combustion chamber design showing the piston and cylinder head with their various affiliated features, and FIG. 2 being a top view of the piston illustrating one preferred shape and position of the combustion chamber bowl. The inventive combustion chamber system is designated by the numeral 10 in FIG. 1. It is to be noted that other shapes and sizes of combustion chamber bowls could be utilized in accordance with the present invention. For example, the bowl could also be an elliptical shape with a major axis aligned with a vertical plane through the cylinder axis.

The system 10 includes an engine 12 of which only a portion is shown, the engine having a plurality of pistons and cylinder chambers or bores, only one of which is shown for illustrative purposes. The system 10 includes a piston 14 and a cylinder head 16, the piston 14 being positioned in a cylinder chamber or bore 18 in the engine 12. The cylinder head 16 has a lower wall with a pair of slanted wall portions 20 and 22, and a relatively flat or horizontal wall portion 24 positioned between them. A spark plug 26 is positioned in the middle wall portion 24 near the central axis 28 of the cylinder bore 18.

One or more intake ports 30 are positioned on the intake-side of the cylinder 18 along wall portion 22. In addition, one or more exhaust ports or outlets 32 are positioned in the exhaust side of the cylinder 18 and along wall portion 20. The spark plug 26 can be of any conventional design and is positioned to extend slightly into the cylinder bore 18. The inlet ports 30 and exhaust ports 32 can be of any standard design and closed by conventional intake and exhaust valves and valving systems (not shown).

A fuel injector 34 is positioned in the lower wall of the cylinder head 16 on the intake valve side of the cylinder bore 18, as shown in FIG. 1. The injector can be of any conventional design and is operated by a conventional spray injector control and system (not shown).

The piston 14 has an upper or top wall or surface 40 which is angled generally to conform with the angles of the wall portions 20 and 22 of the lower wall of the cylinder head 16. The piston 14 also has a combustion bowl 42 in its upper surface which is used to mix the air and fuel and direct it toward the spark plug 26.

As shown in FIGS. 1 and 2, the piston bowl 42 which is depicted has a spherical or nearly spherical bowl shape. As mentioned earlier, other shapes and sizes of combustion chamber bowls can be utilized. The bowl 42 is positioned such that the majority of its area is situated on the exhaust-valve side of the cylinder bore 18. In this regard, the center 44 of the piston bowl 42 is preferably positioned 5 to 15 millimeters toward the exhaust side of the central axis 28 of the cylinder bore 18. This distance is indicated by the dimension D in FIGS. 1 and 2.

A small recess or groove 46 can also be provided on the top of the piston 14 if desired. The recess 46 may be necessary to avoid interference with the end of the injector 34, or to ensure that all of the fuel spray from injector 34 enters the piston bowl 42 and does not impinge upon the upper surface 40.

With the present invention, the fuel spray penetration rate at the injector outlet is preferably within the range of 20–40 meters per second (m/s) at the injector outlet. This penetration rate is lower than that of most conventional fuel systems. The lower spray penetration rate provides an improved shape of the fuel zone.

Figure 4:
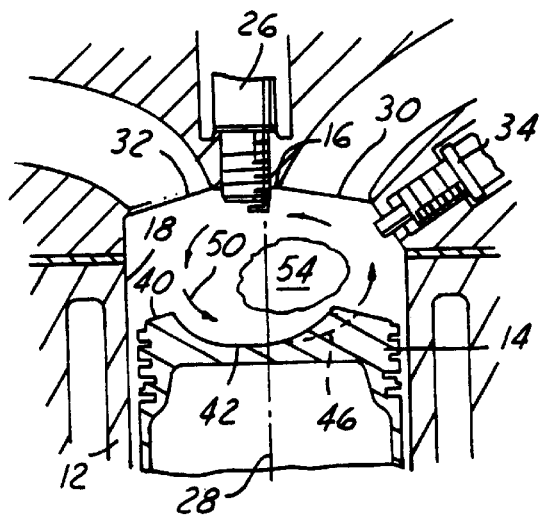
Figure 5:
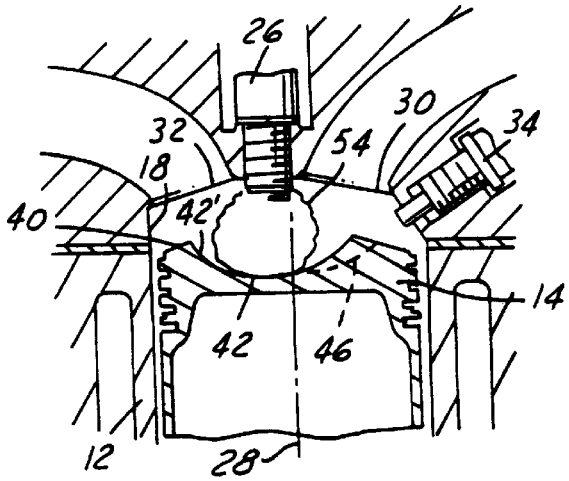

The design of the intake port 30 provides a normal tumble flow of intake air in the cylinder bore 18 and combustion chamber. This is shown by the arrows 50 in FIG. 3. In this regard, FIGS. 3–5 illustrate various steps or sequences in the injection and combustion cycle of fuel and air in the cylinder bore 18 and combustion chamber.

Figure 3:
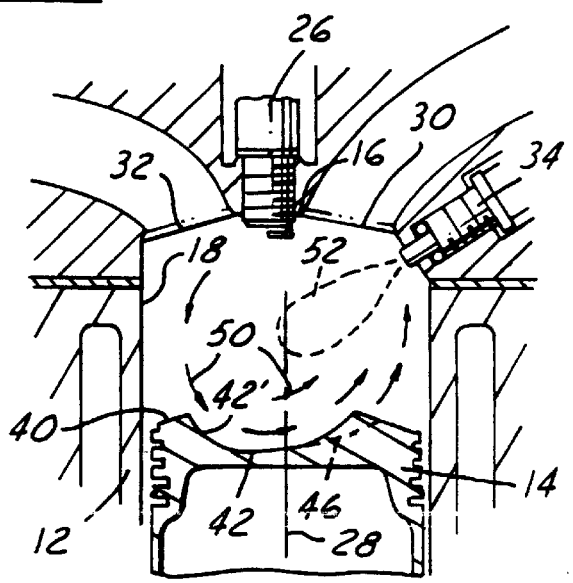
FIGS. 3–5 illustrates the inventive system relative to the interaction of the fuel spray and intake air during various stages of the combustion cycle.

As indicated in FIG. 3, the fuel spray 52 is injected by the fuel injector 34 in a direction toward the far wall 42' of the combustion chamber bowl 42 in the piston 14. In this regard, the fuel spray from the injector diverges as it leaves the injector and forms a fuel mist cloud in the general shape shown in FIG. 3 and indicated by the reference number 52.

As the fuel injection ceases and the piston proceeds in the combustion stroke toward the lower wall of the cylinder head 16, the fuel spray 52 mixes with the inlet air to form an air-fuel cloud or mixture 54. This is shown in FIG. 4.

Thereafter, as the piston 14 proceeds to its top dead center (TDC) position, the air-fuel cloud or mixture 54 is directed toward the spark plug 26 where it is ignited. This is shown in FIG. 5. The ignition of the air-fuel mixture helps propel the piston in its downward stroke in the cylinder in a standard manner. The burned air-fuel mixture is exhausted through the exhaust ports 32 in a conventional manner.

With the present invention, the distance from the fuel injector 34 to the farthest wall 42' of the piston bowl 42 is increased over most conventional systems. Thus, the distance for free penetration of the fuel spray in the cylinder bore is increased. As a result, fuel spray droplets have more time to evaporate before they contact the surface of the piston and wet the piston wall. Also with the present invention, the direction of the normal tumble air flow is generally counter or opposite to the fuel being injected by the injector 34. This in turn slows down the movement of the spray droplets and allows for more droplet evaporation. Again, this reduces the wetting of the wall 42' of the piston bowl 42. Moreover, the relative velocity between the fuel droplets from the injector 34 and the air from the inlets 30 is increased. This further promotes the rate of droplet evaporation.

Due to the in-cylinder tumble air flow used with the present invention, the relative velocity between the air flow and the fuel spray increases as the speed of the engine increases. This provides enhanced mixing and fuel evaporation with speed. In conventional combustion systems, the time for mixing of the fuel and air decreases as the speed of the engine increases.

The in-cylinder tumble flow of air from the inlet ports 30 directs the vapor and fuel cloud 54 upwardly in the cylinder toward the spark plug 26. This provides a satisfactory mixture and amount of air and fuel at the spark plug gap and improves ignitability. This in turn reduces cycle-by-cycle variation of the air-fuel cloud or mixture and reduces the chances of misfiring of the engine.

Figure 6:
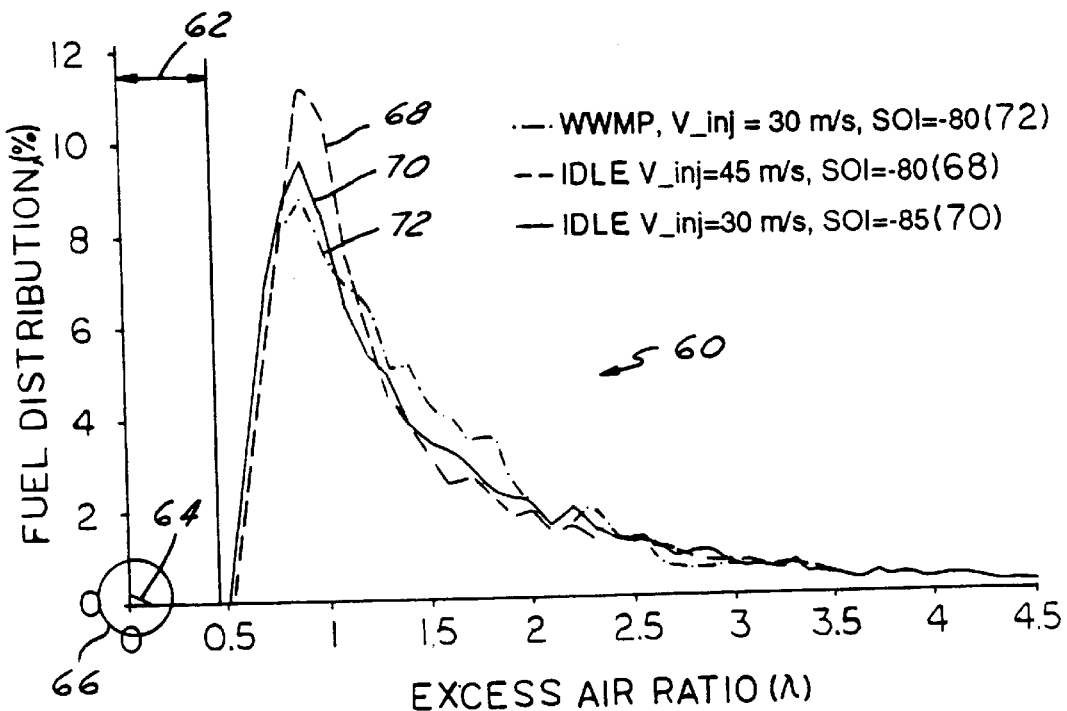
FIG. 6 is a graph illustrating fuel distribution versus excess air ratio in a combustion system utilizing the present invention.

The improved results of the present invention are illustrated in the graph 60 shown in FIG. 6. In that graph, the Fuel Distribution by percentage is illustrated versus the Excess Air Ratio ($\lambda$). With the present invention, there is little fuel in the overly rich fuel region 62. The only fuel shown in that region is referenced by the numeral 64 shown in the circle 66. With little fuel in the overly rich region 62, minimum wall wetting, that is, wetting of the wall 42' of the piston bowl 42, takes place. With a minimum amount of wall wetting, formation of soot is thus minimized or avoided. Also, the amount of hydrocarbons which are unburned in the combustion cycle due to the lack of oxygen is reduced.

As shown in the graph 60, the various curves of 68, 70 and 72 are all centered around the excess air ratio of 1.0. This is beneficial since it indicates that for various operations of the engine, the fuel distribution versus excess air ratio is relatively consistent and uniform.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An in-cylinder injection internal combustion engine having a cylinder bore, a cylinder head, a piston positioned in said cylinder bore, and a combustion chamber formed by a cylinder head lower wall and a top wall of the piston, said engine comprising:

at least one intake port on a first side of said cylinder head lower wall;

at least one exhaust port on a second side of said cylinder head lower wall;

an air intake port communicating with said intake valve and said cylinder head lower wall to provide a tumble flow of inducted air in said combustion chamber;

a spark plug positioned in said cylinder head lower wall between said intake port and said exhaust port;

a combustion bowl positioned in the top wall of the piston, said combustion bowl having a substantially spherical configuration with a majority of the area thereof is positioned in vertical alignment with said second side of said cylinder head lower wall and adjacent the exhaust port; and a fuel injector for directly injecting fuel into said combustion chamber, said fuel injector positioned on said first side of said cylinder head lower wall adjacent said intake port and oriented to direct a fuel spray toward said combustion bowl;

said cylinder bore having a first vertical axis and said combustion bowl having a second vertical axis, said second vertical axis being positioned 5 to 15 millimeters offset from said first vertical axis in the direction of said exhaust port; and said tumble flow of air is directed against the direction of the fuel spray from said fuel injector during at least a portion of the combustion cycle of the piston in the cylinder bore.

2. The engine as set forth in claim 1 further comprising a recess in said top wall of the piston, said recess positioned in substantially vertical alignment with said fuel injector and in communication with said combustion bowl.

3. A method for minimizing piston wall wetting in a combustion chamber in an internal combustion engine, the engine having a cylinder bore, a cylinder head, a piston positioned in said cylinder bore, a combustion chamber formed by the cylinder head lower wall and the top wall of the piston, a combustion bowl in the top wall of the piston, an intake port on a first portion of the cylinder head lower wall, an exhaust port on a second portion of the cylinder head lower wall, a spark plug positioned in the cylinder head lower wall, and a fuel injector positioned on said first portion of the cylinder head lower wall adjacent said intake port, said method comprising the steps of:

injecting a fuel spray from the fuel injector toward the wall of the combustion bowl in the piston farthest in distance from said fuel injector;

positioning the combustion bowl in the top wall of the piston adjacent the exhaust port side of the cylinder head lower wall;

providing an in-cylinder normal tumble flow of air into the combustion chamber from the intake port;

directing said normal tumble flow of air against the fuel spray from the fuel injector to decrease the velocity of the fuel spray, increase evaporation of the fuel spray, and minimize wetting of the walls of the combustion bowl by the fuel spray.

4. The method as set forth in claim 3 further comprising the step of reducing the rate of fuel spray from the fuel injector.

5. The method as set forth in claim 3 wherein the rate of fuel spray is in the range of 20–40 meters per second.

* * * * *